United States Patent
Lu et al.

(10) Patent No.: US 11,086,901 B2
(45) Date of Patent: Aug. 10, 2021

(54) METHOD AND SYSTEM FOR EFFICIENT DATA REPLICATION IN BIG DATA ENVIRONMENT

(71) Applicant: EMC IP Holding Company LLC, Hopkinton, MA (US)

(72) Inventors: Wenbin Lu, Shanghai (CN); Timothy Bruce, Carrollton, TX (US); Leo Lei Wang, Shanghai (CN); Lee Li Ni, Shanghai (CN); Will Youwei Sun, Shanghai (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 166 days.

(21) Appl. No.: 15/884,748

(22) Filed: Jan. 31, 2018

(65) Prior Publication Data
US 2019/0236200 A1 Aug. 1, 2019

(51) Int. Cl.
| | |
|---|---|
| *G06F 16/00* | (2019.01) |
| *G06F 16/27* | (2019.01) |
| *G06F 16/21* | (2019.01) |
| *G06F 16/178* | (2019.01) |
| *G06F 16/182* | (2019.01) |

(52) U.S. Cl.
CPC .......... *G06F 16/275* (2019.01); *G06F 16/178* (2019.01); *G06F 16/182* (2019.01); *G06F 16/211* (2019.01); *G06F 16/27* (2019.01)

(58) Field of Classification Search
None
See application file for complete search history.

(56) References Cited

U.S. PATENT DOCUMENTS

| | | | |
|---|---|---|---|
| 7,457,631 B2 * | 11/2008 | Yach | H04L 67/1095 455/502 |
| 8,136,100 B1 | 3/2012 | Goldman | |
| 8,775,485 B1 | 7/2014 | Cavage et al. | |
| 9,582,328 B1 | 2/2017 | Tao et al. | |
| 10,089,152 B1 | 10/2018 | Kramer et al. | |
| 10,127,151 B2 | 11/2018 | Wrighton | |

(Continued)

OTHER PUBLICATIONS

International Search Report and Written Opinion issued in corresponding PCT/CN2017/108626, dated Jun. 21, 2018 (9 pages).

(Continued)

*Primary Examiner* — Bai D Vu
(74) *Attorney, Agent, or Firm* — Chamberlain, Hrdlicka, White, Williams & Aughtry

(57) ABSTRACT

A system includes a persistent storage and a data transfer manager. The persistent storage stores sending entity storage resources and receiving entity storage resources. The data transfer manager obtains a data transfer request for data in the sending entity storage resources. In response to obtaining the data transfer request, the data transfer manager obtains a sending entity schema associated with the data; determines a current storage location of the data using the obtained sending entity schema; determines a future storage location for a copy of the data in the receiving entity storage resources; stores a copy of the data at the determined future storage location; adapts the sending entity schema based on the determined future storage location; and modifies a receiving entity schema based on the adapted sending entity schema.

20 Claims, 13 Drawing Sheets

(56) References Cited

U.S. PATENT DOCUMENTS

| | | | |
|---|---|---|---|
| 2001/0016881 A1 | 8/2001 | Sanchez | |
| 2002/0019972 A1 | 2/2002 | Grier et al. | |
| 2005/0044530 A1 | 2/2005 | Novik | |
| 2006/0123412 A1 | 6/2006 | Hunt et al. | |
| 2006/0277224 A1 | 12/2006 | Aftab et al. | |
| 2007/0260575 A1 | 11/2007 | Robinson et al. | |
| 2009/0083441 A1* | 3/2009 | Clark | G06N 5/02 709/248 |
| 2012/0109988 A1 | 5/2012 | Li et al. | |
| 2013/0047150 A1 | 2/2013 | Malasky | |
| 2014/0006459 A1 | 1/2014 | Guo et al. | |
| 2015/0120479 A1 | 4/2015 | Bastien et al. | |
| 2016/0232191 A1 | 8/2016 | Adrian et al. | |
| 2016/0357544 A1 | 12/2016 | Lewallen | |
| 2017/0139746 A1 | 5/2017 | Maier et al. | |
| 2017/0308602 A1* | 10/2017 | Raghunathan | G06F 16/2365 |
| 2017/0344227 A1 | 11/2017 | Stoicov et al. | |
| 2018/0253451 A1* | 9/2018 | Callan | H04L 9/3239 |

OTHER PUBLICATIONS

Extended European Search Report issued in corresponding European Application No. 19151906.5, dated Apr. 12, 2019.

\* cited by examiner

METHOD AND SYSTEM FOR EFFICIENT DATA REPLICATION IN BIG DATA ENVIRONMENT

BACKGROUND

Computing devices may generate new data based on stored data. For example, a computing device may store a database that includes sales data for a variety of products over a period of time. The computing device may generate new data by calculating an average sale price of each sale.

In some situations, data may be copied between different computing devices so that each computing device has access to the same information. For example, a second computing device may wish to have access to the calculated average sale price. This may be accomplished by copying the calculated average sale price and storing it in a persistent storage of the second computing device.

SUMMARY

In one aspect, a system in accordance with one or more embodiments of the invention includes a persistent storage and a data transfer manager. The persistent storage stores sending entity storage resources and receiving entity storage resources. The data transfer manager obtains a data transfer request for data in the sending entity storage resources. In response to obtaining the data transfer request, the data transfer manager obtains a sending entity schema associated with the data; determines a current storage location of the data using the obtained sending entity schema; determines a future storage location for a copy of the data in the receiving entity storage resources; stores a copy of the data at the determined future storage location; adapts the sending entity schema based on the determined future storage location; and modifies a receiving entity schema based on the adapted sending entity schema.

In one aspect, a method of transferring data from a sending entity to a receiving entity in accordance with one or more embodiments of the invention includes obtaining a data transfer request for the data in sending entity storage resources associated with the sending entity. The method further includes, in response to obtaining the data transfer request, obtaining a sending entity schema associated with the data; determining a current storage location of the data using the obtained sending entity schema; determining a future storage location for a copy of the data in receiving entity storage resources associated with the receiving entity; storing a copy of the data at the determined future storage location; adapting the sending entity schema based on the determined future storage location; and modifying a receiving entity schema, associated with the receiving entity, based on the adapted sending entity schema.

In one aspect, a non-transitory computer readable medium in accordance with one or more embodiments of the invention includes computer readable program code, which when executed by a computer processor enables the computer processor to perform a method for transferring data from a sending entity to a receiving entity. The method includes obtaining a data transfer request for the data in sending entity storage resources associated with the sending entity. The method further includes, in response to obtaining the data transfer request, obtaining a sending entity schema associated with the data; determining a current storage location of the data using the obtained sending entity schema; determining a future storage location for a copy of the data in receiving entity storage resources associated with the receiving entity; storing a copy of the data at the determined future storage location; adapting the sending entity schema based on the determined future storage location; and modifying a receiving entity schema, associated with the receiving entity, based on the adapted sending entity schema.

BRIEF DESCRIPTION OF DRAWINGS

Certain embodiments of the invention will be described with reference to the accompanying drawings. However, the accompanying drawings illustrate only certain aspects or implementations of the invention by way of example and are not meant to limit the scope of the claims.

DETAILED DESCRIPTION

Figure 1:
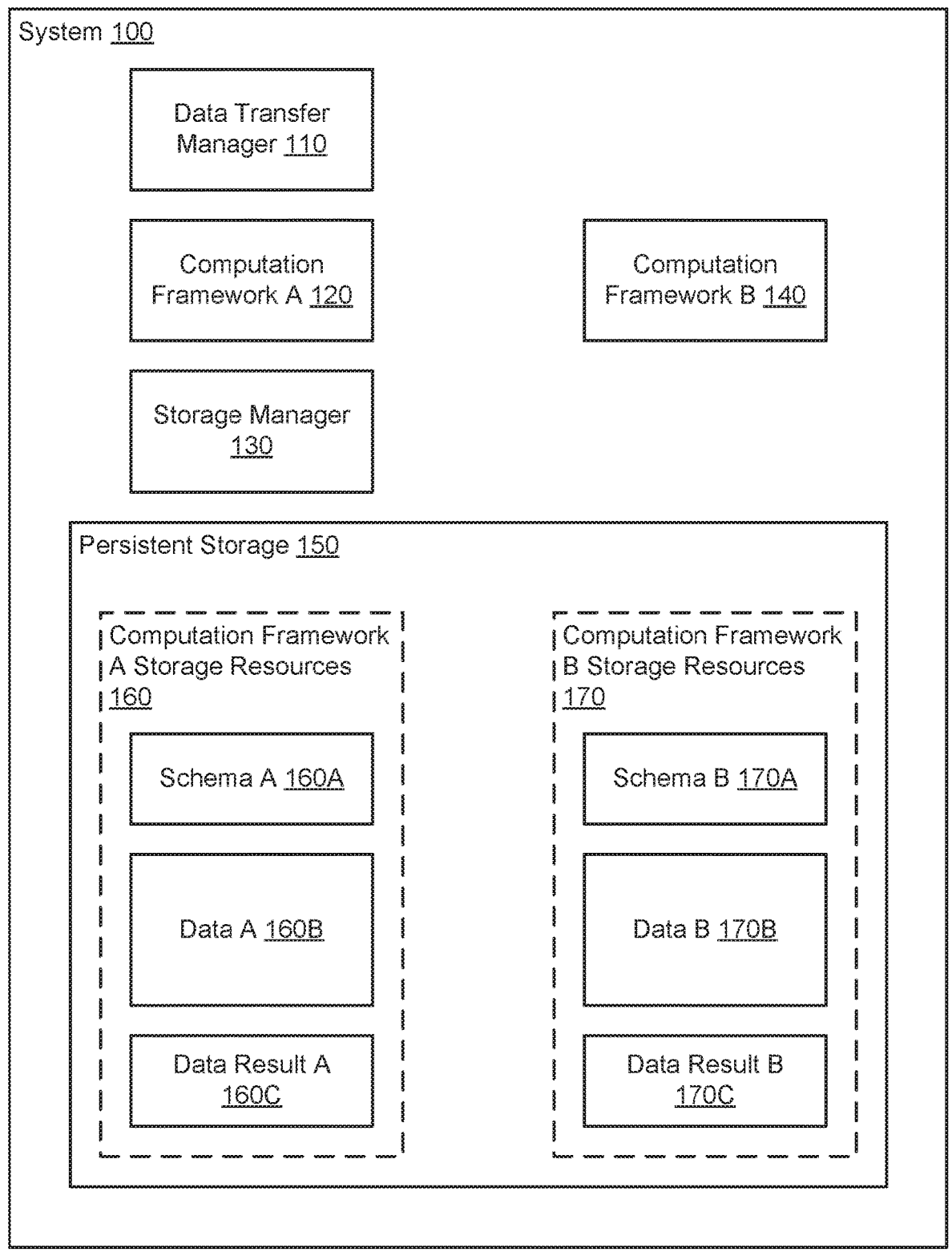
FIG. 1 shows a diagram of a system in accordance with one or more embodiments of the invention.

Specific embodiments will now be described with reference to the accompanying figures. In the following description, numerous details are set forth as examples of the invention. It will be understood by those skilled in the art that one or more embodiments of the present invention may be practiced without these specific details and that numerous variations or modifications may be possible without departing from the scope of the invention. Certain details known to those of ordinary skill in the art are omitted to avoid obscuring the description.

In the following description of the figures, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment, which may be implemented in addition to, in conjunction with, or in place of the embodiments described with regard to a corresponding like-named component in any other figure.

In general, embodiments of the invention relate to systems, devices, and methods for managing data and, more specifically, replication of data between instances of computation frameworks. The computation frameworks may be portions of a big data environment, e.g., frameworks for performing computations on large data sets that may be stored across many computing devices. A system may include multiple computation frameworks. As used herein, a computation framework refers to an entity that generates new data based on old data. For example, a computation framework may be a portion of a relational data management system. In another example, the computation framework may be portion of a relational data stream management system. In a further example, the computation framework may be an implementation, based on a programming model, for processing and/or generating data sets with a parallel and/or distributed algorithm on a cluster. In a still further example, the computation framework may be a component of a Hadoop instance orchestrating the operation of a cluster of computing devices.

In one more embodiments of the invention, the multiple computation frameworks have separate, exclusive storage resources for storing data, schema, and/or data results. As used herein, a schema refers to an organizational structure of the data. For example, a schema may be metadata used to delineate portions of the data stored in a persistent storage. The schema may include information used to retrieve different portions of the data from the persistent storage. In another example, a schema may be an organizational structure of data stored in a data warehouse or massively parallel processing database. As used herein, a data result refers to a result of a computation performed by one of the computation frameworks.

In one or more embodiments of the invention, the system includes a data transfer manager that provides a method of copying data from storage resources associated with a first computation framework to storage resources associated with a second computation framework. The data transfer manager may perform the copying without using either computation framework to obtain the data for transfer. For example, the data transfer manager may send storage access requests to a storage manager that provides access to the persistent storage. Thus, one or more embodiments of the invention may provide a method of copying data between different storage resources associated with different computation frameworks. By doing so, the data may be copied without invoking computations performed by either computation framework for obtaining and/or reading the to-be-copied data. Invoking computations by either computation framework may come at a large computing resource cost and thereby make copying data between different computation frameworks resources intensive if such computations are invoked. In one or more embodiments of the invention, a schema associated with the to-be-copied may be obtained by invoking a computational framework associated with the to-be-copied data.

As used herein, computing resources refer to processor computing cycles, communication bandwidth, memory bandwidth, persistent storage input-output cycles, and/or memory storage capacity or persistent storage capacity. Memory may be provided by, for example, random access memory. Persistent storage may be provided by, for example, magnetic media such as a hard disk drive, optical media, or solid state storage such as flash storage/phase change media storage. Processor computing cycles may be provided by, for example, a central processing unit. Communication bandwidth may be provided by, for example, a network interface card.

FIG. 1A shows a system (100) in accordance with one or more embodiments of the invention. The system (100) may include a data transfer manager (110) that orchestrates the transfer of data between different computation frameworks (120, 140). The different computation frameworks (120, 140) may have respective computation framework storage resources (160, 170) stored in persistent storage (150). The respective storage resources (160, 170) may store data (160B, 170B), schema (160A, 170A), and/or data results (160C, 170C). The system (100) may include a storage manager (130) that provides the data transfer manager (110) and computation frameworks (120, 140) with access to the storage resources (160, 170). Each component of the system is discussed below.

In one or more embodiments of the invention, the data transfer manager (110) manages the transfer of data between computation frameworks (120, 140). As used herein, transferring data between computation frameworks means to store a copy of data stored in storage resources associated with a first computation framework in storage resources associated with a second computation framework and provide the second computation framework with notice of the copied data. In some embodiments of the invention, the process of transferring data may delete the data from an entity from which the data was transferred. In some embodiments of the invention, the processing of transferring data does not delete the data from the entity from which the data was transferred.

To provide the aforementioned data transfer functionality, the data transfer manager (110) may: (i) invoke a computation framework to obtain a copy of a schema, (ii) identify the location where the to-be-copied data is stored in the persistent storage using the schema, (iii) send data access requests to the storage manager (130) based on the identified location to obtain the to-be-copied data without invoking the computation framework, (iv) send write commands to the storage manager (130) to store the obtained to-be-copied data in storage resources of the computation framework to which the data is to be copied, (v) update the schema of the computation framework to which the data has been copied, and (vi) invoke processing of the copied data by the computation to which the data has been copied. The data transfer manager (110) may perform additional, fewer, or different actions to transfer data without departing from the invention.

In one or more embodiments of the invention, the data transfer manager (110) performs one or more, or a portion thereof, of the methods illustrated in FIGS. 3A-3F to transfer data between computation frameworks. The data transfer manager (110) may transfer the data between computation frameworks (120, 140) using other methods without departing from the invention. Other components of the system (100) may perform all or a portion of the methods illustrated in FIGS. 3A-3F without departing from the invention.

In one or more embodiments of the invention, the data transfer manager (110) is implemented as one or more processes executing using computing resources of a distributed cluster of computing devices. For details regarding computing devices, See FIG. 5. The processes may execute in accordance with computer instructions stored on a non-transitory computer readable media. The computing instructions, when executed using processing computing resources of the computing devices cause the computing device(s) to perform the functions of the data transfer manager (110) and/or all or a portion of the methods illustrated in FIGS. 3A-3F.

In one or more embodiments of the invention, the system (100) includes any number of computing devices (not shown). Each of the computing devices may be operably connected to any number of the other computing devices of the system. In one or more embodiments of the invention, groups of the computing devices may be organized into respective clusters. The respective clusters may be utilized by different computation frameworks. In other words, each computation framework may orchestrate the execution of computations via different clusters.

Further, in some embodiments of the invention, each computation framework is executing in a virtualized environment and utilizes the computing resources of virtual machines rather than physical computing devices. Thus, in some embodiments of the invention, the computation frameworks may utilize any portion of any number of computing devices and may share the computing resources of some computing devices. For example, a computing device may host two virtual machines each associated with different computation frameworks.

In one or more embodiments of the invention, the computing devices of the system (100) are operably connected to one or more clients. As used herein, a client may be any entity that initiates data transfers between computation frameworks. A client may be, for example, a computing device operated by a user. The computing device may include a process that obtains input from the user and initiates data transfers between computation frameworks based on the input from the user.

In one or more embodiments of the invention, the data transfer manager (110) is implemented as a hardware device such as, for example, a programmable gate array, an application specific integrated circuit, or another electronic device including circuitry that provide the aforementioned functionality of the data transfer manager (110).

In one or more embodiments of the invention, each computation framework (120, 140) orchestrates the execution of computations on data (160B, 170B) stored in the persistent storage (150). The computations may generate data results (160C, 170C) which are also stored in the persistent storage (150).

In one or more embodiments of the invention, each computation framework (120, 140) includes the functionality to generate a data result that reflects the schema of the respective computation framework. In other words, the computation frameworks (120, 140) may export the schema. In one or more embodiments of the invention, each computation framework (120, 140) includes the functionality to generate a data result that reflects a portion of the stored data. In other words, the computation frameworks (120, 140) may export any portion of the data (160B, 170B). As noted above, performing any computations via the computation frameworks may consumer large amounts of computing resources. For example, exporting data may cause a copy of the data to be stored in the persistent storage separate from the other data. Doing so causes a duplicate copy of a portion of the data to be stored, utilizes persistent storage input-output, and consumes other computing resources. While this approach may have been previously acceptable, the advent of big data analysis has made this approach unsustainable for copying data between computation frameworks. As will be discussed in greater detail below, one or more embodiments of the invention provide a method of transferring data that is more efficient than the previous methods used that relied on obtaining of the to-be-transferred data by utilizing a computation framework.

In one or more embodiments of the invention, each computation framework (120, 140) is implemented as one or more processes executing using computing resources of a distributed cluster of computing devices. For details regarding computing devices, See FIG. 5. The processes may execute in accordance with computer instructions stored on a non-transitory computer readable media. The computing instructions, when executed using processing computing resources (e.g., processor (502), FIG. 5) of the computing devices cause the computing device(s) to perform the functionality of the respective computation frameworks (120, 140) discussed above.

As noted above, the system (100) may include any number of computing devices (not shown) grouped into respective clusters. Each of the computation frameworks (120, 140) may utilize the computing resources of the respective clusters. In one or more embodiments of the invention, each respective cluster may be organized as distributed computing environments. The distributed computing environment may orchestrate the operation of each computing device in a respective cluster. In such a scenario, each computation framework may include functionality to subdivide a computation into any number of sub-computations, provide the sub-computations to the distributed computing environment for execution, and obtain the result by aggregating the results of the sub-computations performed by the respective cluster.

In one or more embodiments of the invention, the storage manager (130) manages the storage or access of data in the persistent storage. As will be discussed in greater detail below, the persistent storage (150) may be implemented as a distributed storage. The storage manager (130) may organize the storage resources of the distributed storage and store/access data in the distributed storage in response to storage/access requests from the data transfer manager (110), computation frameworks (120, 140) or other entity (not shown).

In one or more embodiments of the invention, storage manager (130) organizes the distributed storage into blocks. The blocks may be of any size and be of any storage capacity. For example, each block may have a storage capacity of 128 megabytes (MB), 512 MB, 1 gigabyte (GB), etc. The blocks may have other storage capacities without departing from the invention. Different blocks may have different storage capacities without departing from the invention.

In one or more embodiments of the invention, the storage manager (130) provides block level read and/or write functionality to the distributed storage. In other words, the storage manager (130) may read and/or write entire blocks of the persistent storage (150). In contrast, other organizational systems such as, for example, a file allocation table (FAT) or a new technology file system (NTSF) may provide file level access.

In one or more embodiments of the invention, the storage manager (130) provides file level access. The storage manager (130) may cooperate with other components of the system to read only the blocks implicated by a file level access request.

In one or more embodiments of the invention, the storage manager is implemented as one or more processes executing using computing resources of a distributed cluster of computing devices. For details regarding computing devices, See FIG. 5. The processes may execute in accordance with computer instructions stored on a non-transitory computer readable media. The computing instructions, when executed using processing computing resources of the computing devices cause the computing device(s) to perform the functionality of the storage manager (130).

As noted above, the system (100) may include any number of computing devices (not shown) grouped into respective clusters. The storage manager (130) may utilize the computing resources of the respective clusters. As will be discussed in greater detail below, the persistent storage (150) may be an abstraction of the storage resources of the computing devices of the respective clusters. Thus, the storage manager (130) may organize and provide access to the aggregate storage resources of the respective clusters.

In one or more embodiments of the invention, the persistent storage (150) is a data storage device utilized by the computation frameworks (120, 140) to store data structures. The persistent storage (150) may store data structures that include data (160B, 170B), schema (160A, 170A), and/or data results (160C, 170C) used and/or generated by the computation frameworks (120, 140). For additional details regarding the data structures, See FIGS. 2A-2C.

In one or more embodiments of the invention, the persistent storage (150) is implemented as a distributed storage. As discussed above, the system (100) may include any number of computing devices. The computing devices may be grouped into clusters. The persistent storage (150) may be the aggregate storage resources of the computing devices of the clusters. Each cluster may be associated with and exclusively utilized by a respective computation framework and, thereby, partition the storage resources of the persistent storage (150) into computation framework storage resources (160, 170) exclusively used by each respective computation framework. For example, a first computation framework may be associated with a first cluster and utilize the computing resources and storage resources of the first cluster while a second computation framework may be associated with a second cluster and utilize the computing resources and storage resources of the second cluster. The partitions may be logical partitions that delineate storage resources based on logical identifiers of portions of physical devices or physical partitions that delineate storage resources based on physical devices without departing from the invention.

While the system (100) illustrated in FIG. 1 includes two computation frameworks (120, 140) and associated storage resources (160, 170), embodiments of the invention are not so limited. The system (100) may include any number of computation frameworks and associated storage resources without departing from the invention.

As discussed above, the computation frameworks (120, 140) may utilize or generate data structures stored in the persistent storage (150). To further clarify the aforementioned data structures, FIGS. 2A-2D show examples of the aforementioned data structures.

Figure 2A:
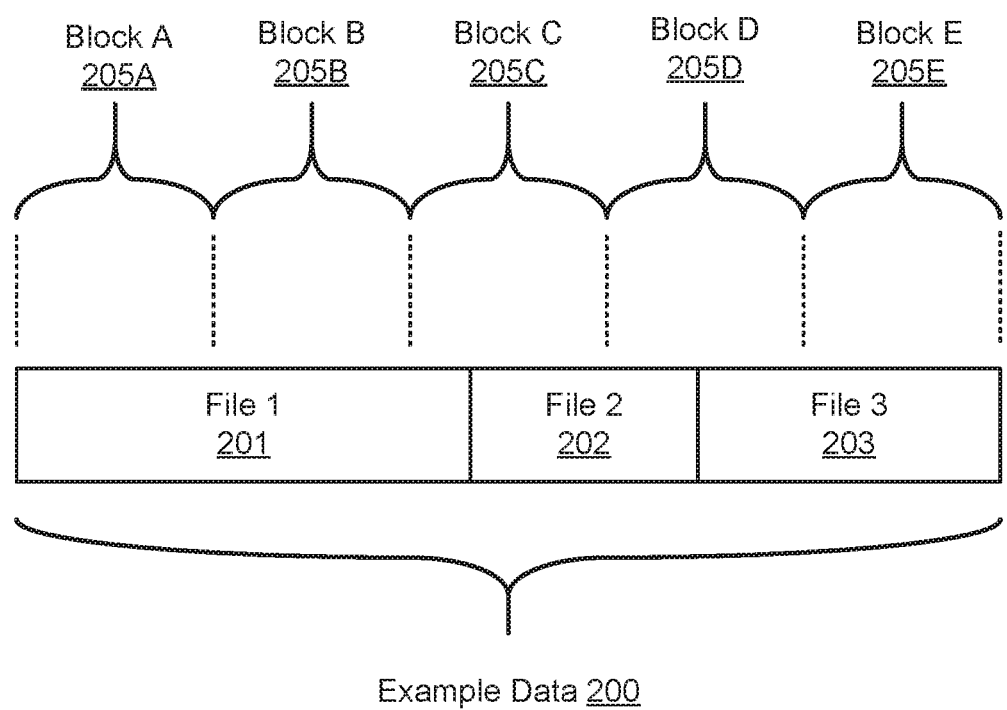
FIG. 2A shows a diagram of example data in accordance with one or more embodiments of the invention.

FIG. 2A shows a diagram of example data (200) in accordance with one or more embodiments of the invention. The example data (200) may be a data structure that includes any type, content, and/or arrangement of data. For example, the data may include three files (201, 202, 203). The example data may include any number of files without departing from the invention. The example data (200) may be of any size.

As discussed above, the storage resources of the persistent storage may be organized into blocks by the storage manager (130, FIG. 1). To further clarify the relationship between blocks and data, illustrations of the example data (200) divided blocks (205A-205E) are shown. As seen from FIG. 2A, when the example data (200) is stored, different portions are stored in different blocks. The end or start of files need not line up with the beginning or ending of a block. Thus, a file of the example data (200) may be stored across multiple blocks. Accordingly, to obtain the file all of the blocks including a portion of the file must be read. For example, with respect to file 3 (203), block D (205D) and block E (205E) would need to be read to obtain the aforementioned file because each of the blocks includes a portion of file 3 (203). The schemas (160A, 170A, FIG. 1) and data results (160C, 170C, FIG. 1) may be similarly stored across multiple blocks.

Figure 2B:
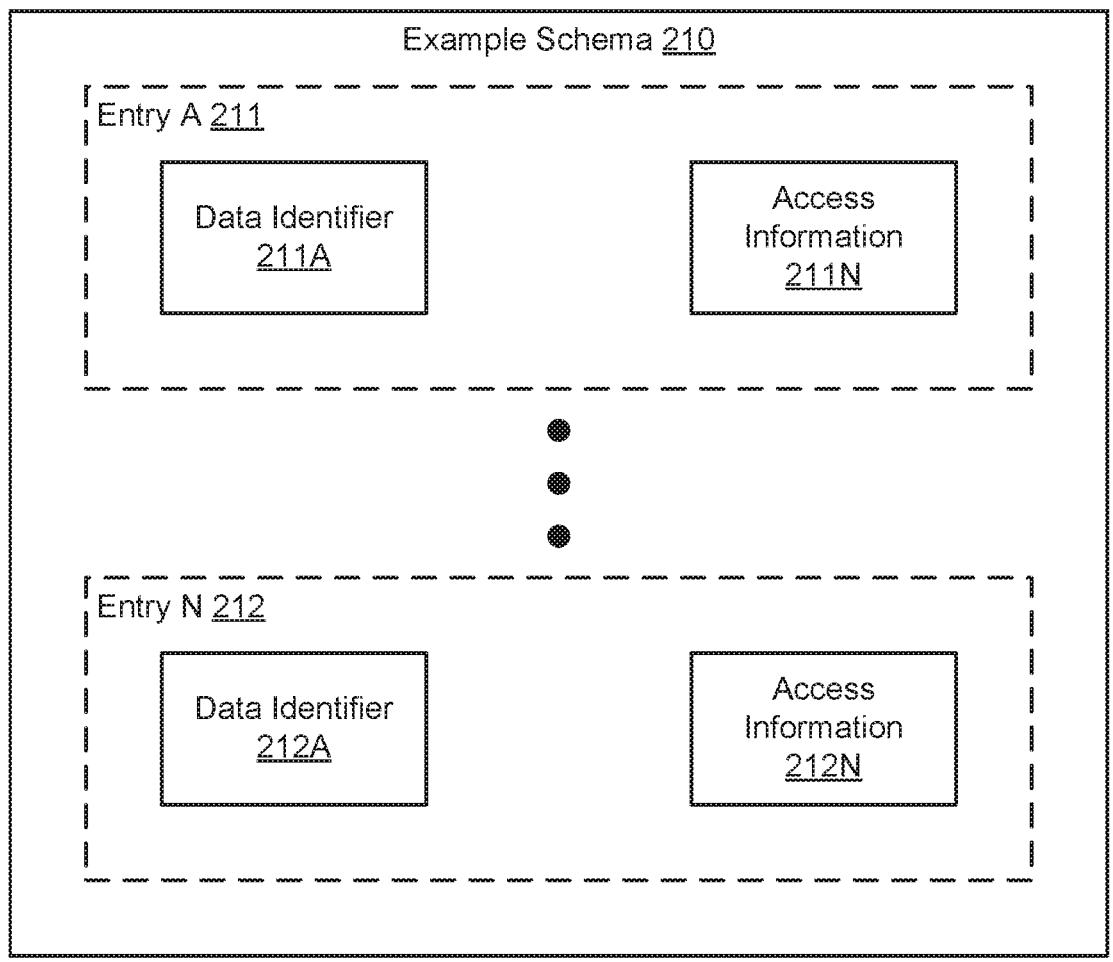
FIG. 2B shows a diagram of an example schema in accordance with one or more embodiments of the invention.

FIG. 2B shows a diagram of an example schema (210) in accordance with one or more embodiments of the invention. The example schema (210) may be a data structure that includes information that described the organizational structure of the persistent storage (150, FIG. 1). The example schema (210) may be used to access portions of the stored data. In one or more embodiments of the invention, the example schema (210) includes metadata regarding the data and/or data results that specifies: (i) the portions of the data/data results and/or (ii) access information that may be used to read the respective portions of the data/data results.

In one or more embodiments of the invention, the example schema (210) includes any number of entries (211, 212). Each entry may be associated with a respective file of the data or data result. Each entry may include: (i) an identifier of the respective file of the data or data result and (ii) access information for the respective portion of the data or data result. The identifier may be, for example, a file name or other identifier. The access information may be, for example, block identifiers of blocks that store portions of the file or data result. The access information may also include indexing information so that only the portion of each block storing a portion of the file of the data or data result may be obtained when the respective block is read. While illustrated as a list of entries, the example schema (210) may be organized differently without departing from the invention.

Figure 2C:
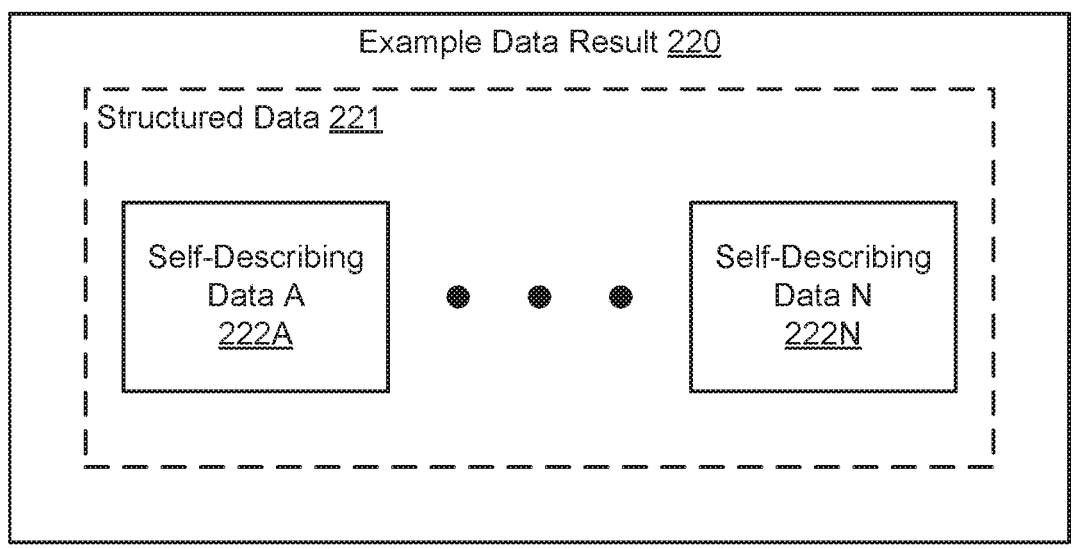
FIG. 2C shows a diagram of an example data result in accordance with one or more embodiments of the invention.

FIG. 2C shows a diagram of an example data result (220) in accordance with one or more embodiments of the invention. The example data result (220) may be a data structure that includes information generated from a computation performed by a computation framework. The example data result (220) may include any type and quantity of data.

In one or more embodiments of the invention, the example data result (220) includes structured data (221). The structured data (221) may be, for example, a table, a list, or another hierarchically organized structure. The structured data (221) may include any quantity of self-describing data (222A, 222N). The self-describing data (222A, 222N) may include embedded metadata so the data result may be readily interpreted.

As discussed above, the data transfer manager (110, FIG. 1) may orchestrate data transfers. FIGS. 3A-3F show methods in accordance with one or more embodiments of the invention that may be performed by the data transfer manager (110, FIG. 1).

While illustrated as separate methods, each of the methods illustrated in FIGS. 3A-3F may be performed sequentially or in parallel (or a combination of both serial and parallel execution) without departing from the invention. Further, one of ordinary skill will appreciate that some or all of these steps may be executed in different orders, may be combined or omitted, and some or all of the steps may be executed in parallel.

Figure 3A:
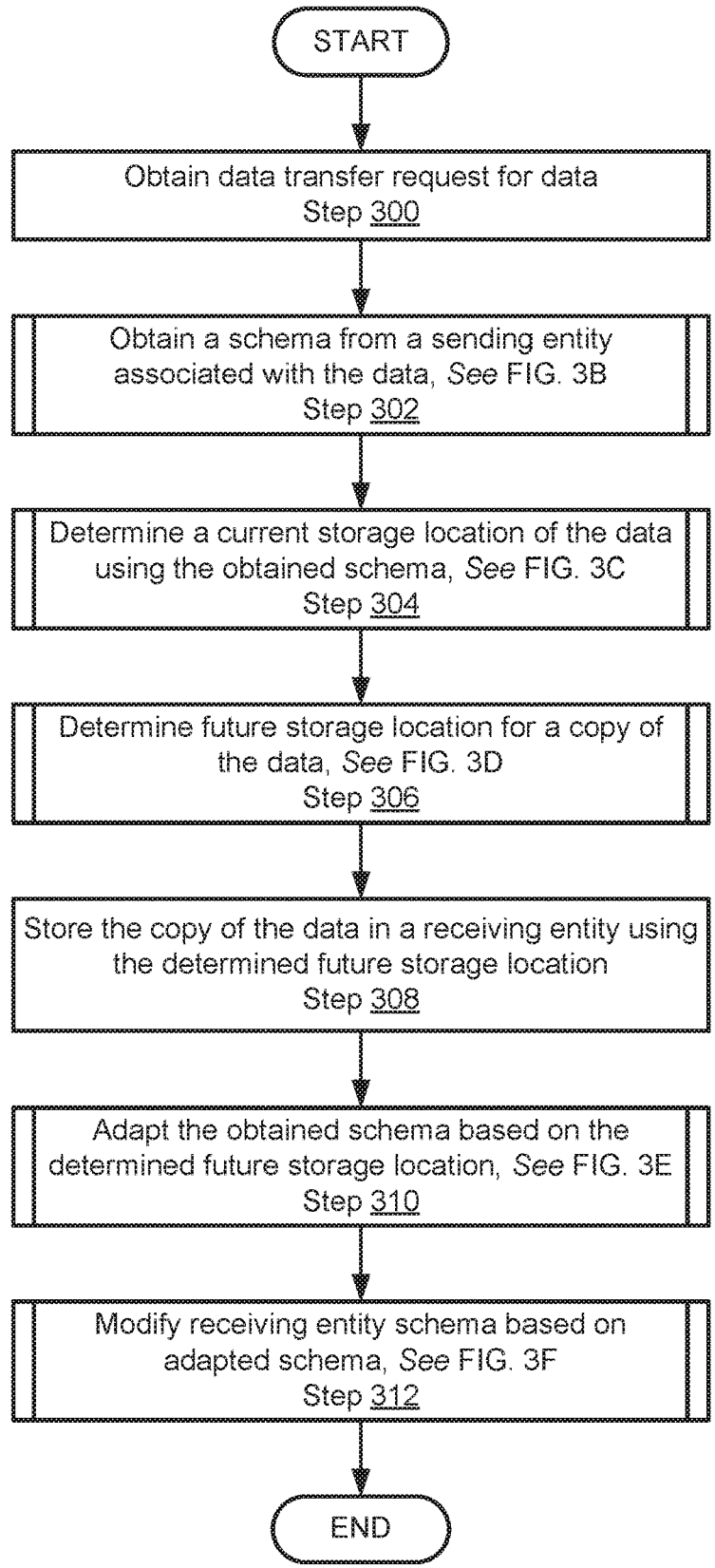
FIG. 3A shows a diagram of a flowchart of a method of transferring data in accordance with one or more embodiments of the invention.

FIG. 3A shows a flowchart of a method in accordance with one or more embodiments of the invention. The method depicted in FIG. 3A may be used to transfer data between computation frameworks in accordance with one or more embodiments of the invention. The method shown in FIG. 3A may be performed by, for example, a data transfer manager (110, FIG. 1). Other component of the system (100) illustrated in FIG. 1 may perform the method of FIG. 3A without departing from the invention.

In Step 300, a data transfer request for data is obtained.

In one or more embodiments of the invention, the data transfer request is obtained from a user. In one or more embodiments of the invention, the data transfer request is obtained from a computation framework. The data transfer request may be obtained from other entities without departing from the invention.

In one or more embodiments of the invention, the data transfer request is obtained via receiving a message. The data transfer request may include an identifier of the data to be transferred. The data transfer request may specify a computation framework to which the data is to be transferred.

In Step 302, a schema from a sending entity associated with the data is obtained.

In one or more embodiments of the invention, the sending entity is the computation framework associated with the data. In other words, the computation framework in which the data is stored. For example, as described with respect to FIG. 1, each computation framework may include storage resources exclusively used by each computation framework.

In one or more embodiments of the invention, the schema has a structure as illustrated in FIG. 2B. The schema may describe the organizational structure of all of the data of the computation framework.

In one or more embodiments of the invention, the schema is made by invoking a computation performed by the computation framework associated with the data.

Figure 3B:
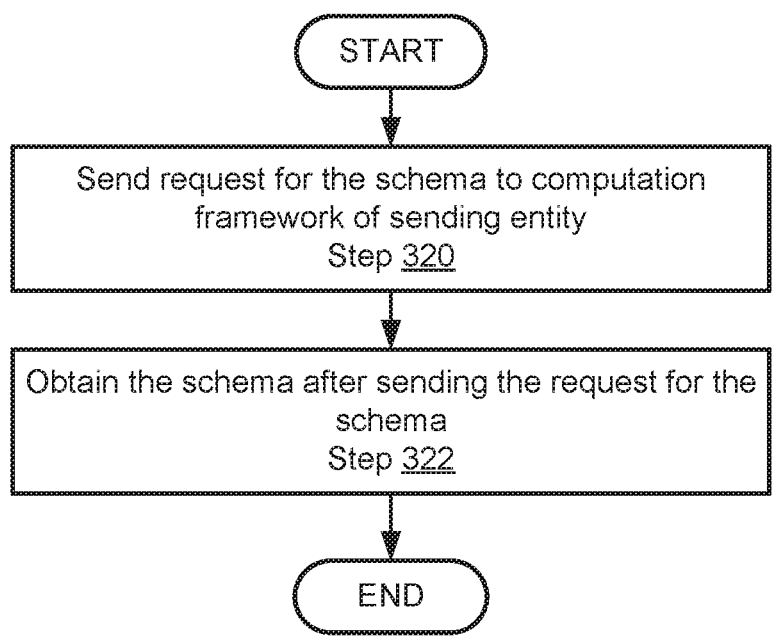
FIG. 3B shows a diagram of a flowchart of a method of obtaining a schema in accordance with one or more embodiments of the invention.

In one or more embodiments of the invention, the schema is obtained using the method illustrated in FIG. 3B. The schema may be obtained using other methods without departing from the invention.

In Step 304, a current storage location of the data is determined using the obtained schema.

In one or more embodiments of the invention, current storage location includes the block identifiers and accessing information of each block of each portion of the data. As described with respect to FIG. 2A, data may be stored across any number of blocks. The block identifiers may be used to obtain the blocks via a storage manager that provides block level access and the accessing information may provide offsets into blocks so that only the portion of the blocks storing portions of the data may be obtained. The current storage location may include file identifiers in junction with or alternatively to block identifiers/access information for each block without departing from the invention. The file identifiers may be used to obtain associated block identifiers/access information for each block.

For example, access information for a block may be an offset from the start of the block to a portion within the block. The remaining portion of the block may be a portion of the data. The access information may include descriptive information other than an offset to describe the relative location of portions of data within a block without departing from the invention.

Figure 3C:
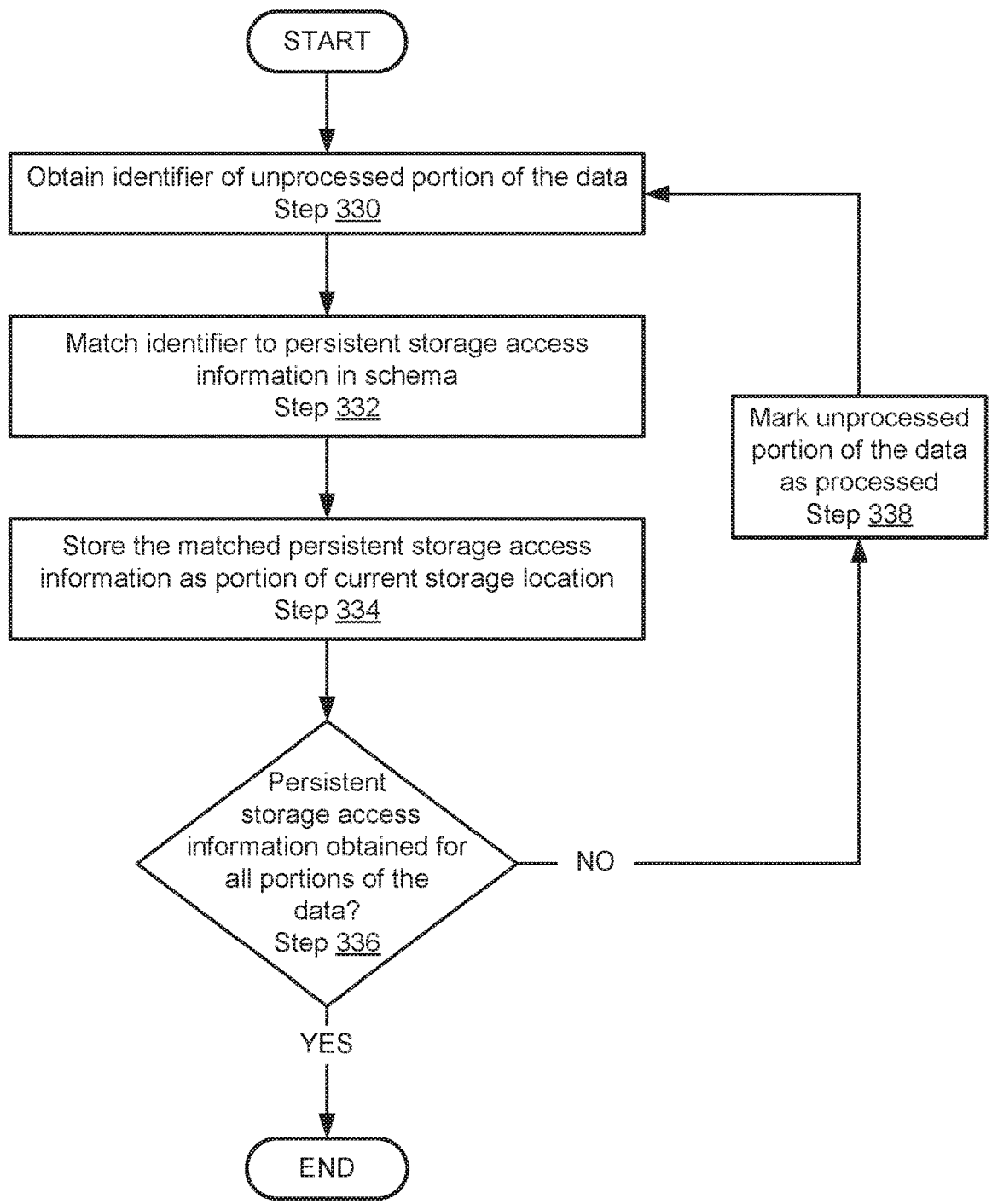
FIG. 3C shows a diagram of a flowchart of a method of determining a current storage location of data in accordance with one or more embodiments of the invention.

In one or more embodiments of the invention, the current storage location is determined using the method illustrated in FIG. 3C. The current storage location may be obtained using other methods without departing from the invention.

In Step 306, a future storage location for a copy of the data is determined.

In one or more embodiments of the invention, the future storage location is a location within the storage resources of a computation framework to which the data is being transferred.

In one or more embodiments of the invention, the future storage location may be determined by sending a request to a storage manager regarding the availability for storage of blocks within the storage resources of the computation framework to which the data is to be transferred. In response, the storage manager may send a listing of available blocks. The location may then be selected based on the available blocks.

In one or more embodiments of the invention, the future storage location may be determined by sending a request to a computational framework regarding the availability for storage of blocks within the storage resources of the computation framework to which the data is to be transferred. In response, the computation framework may send a listing of available blocks. The location may then be selected based on the available blocks.

Figure 3D:
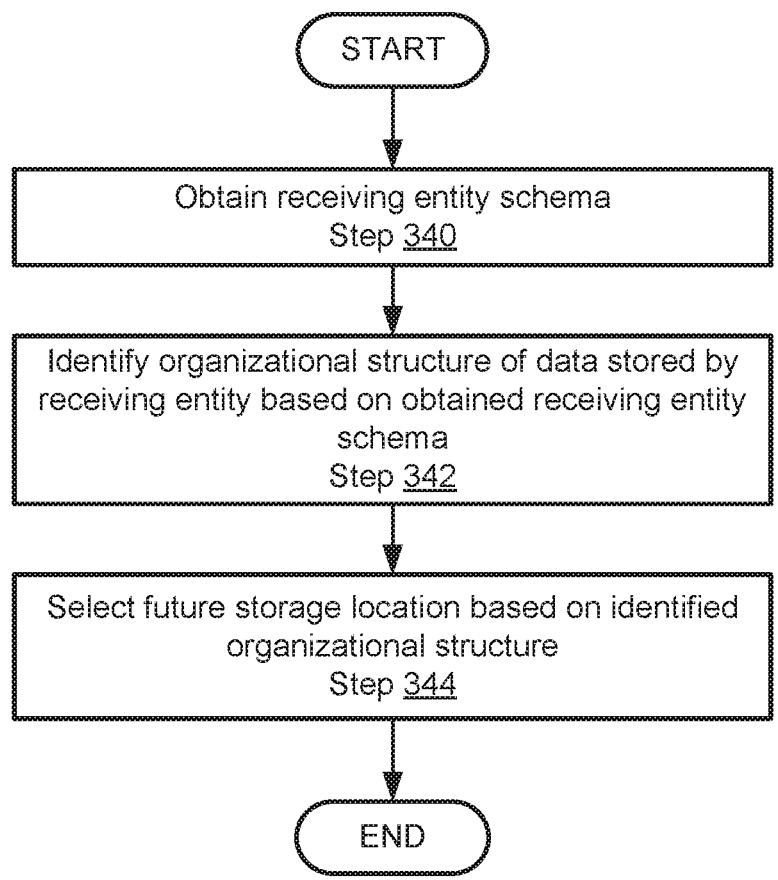
FIG. 3D shows a diagram of a flowchart of a method of determining a future storage location for data in accordance with one or more embodiments of the invention.

In one or more embodiments of the invention, the future storage location is determined using the method illustrated in FIG. 3D. The future storage location may be obtained using other methods without departing from the invention.

In Step 308, a copy of the data is stored in a receiving entity using the determined future storage location.

In one or more embodiments of the invention, the receiving entity is a computation framework to which the data is to be transferred. In one or more embodiments of the invention, the copy of the data is stored in the storage resources of the receiving entity at the location specified by the future storage location.

In Step 310, the obtained schema is adapted based on the determined future storage location.

In one or more embodiments of the invention, adapting the schema modifies the portion of the schema the specified the current storage location to reflect the future storage location.

Figure 3E:
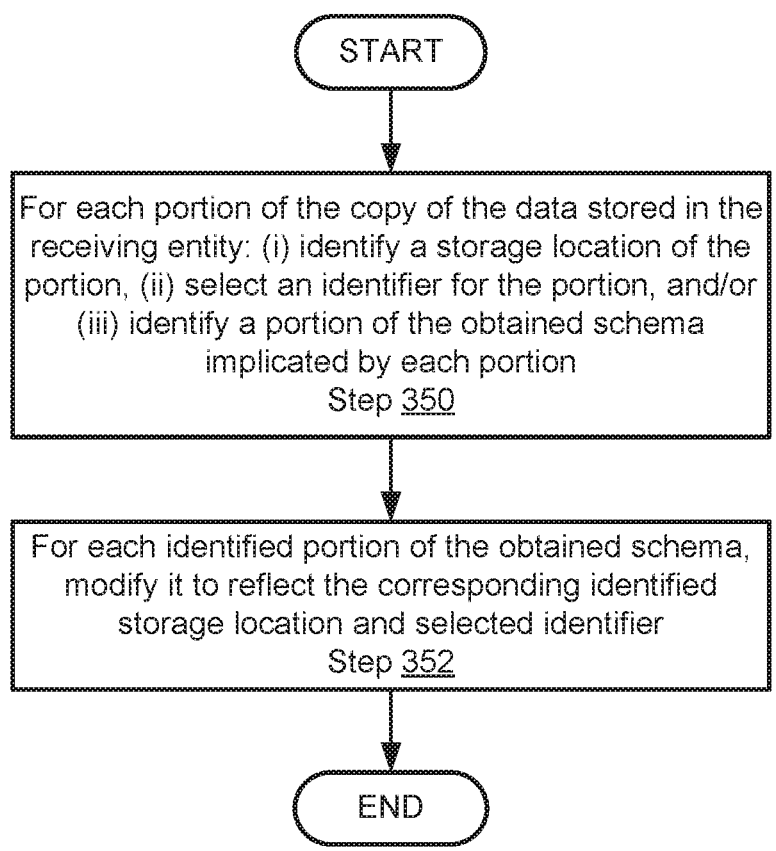
FIG. 3E shows a diagram of a flowchart of a method of adapting a schema in accordance with one or more embodiments of the invention.

In one or more embodiments of the invention, the schema is adapted via the method illustrated in FIG. 3E. The schema may be adapted via other methods without departing from the invention.

In one or more embodiments of the invention, the schema is further adapted based on an organizational difference between a schema of the sending entity and the schema of the receiving entity. The schemas of the respective sending and receiving entities may specify the organization of the data within the storage resources of the respective computation frameworks. Adapting the obtained schema based on the schema of the receiving entity may change the organizational structure of the obtained schema to reflect the organizational structure of the receiving entity.

In Step 312, the receiving entity schema is modified based on the adapted schema.

In one or more embodiments of the invention, modifying the receiving entity schema based on the adapted schema adds metadata to reflect the stored copy of the data in Step 308. Thus, once modified, the receiving entity schema may properly reflect the data added to the storage resources of the receiving entity in Step 308.

Figure 3F:
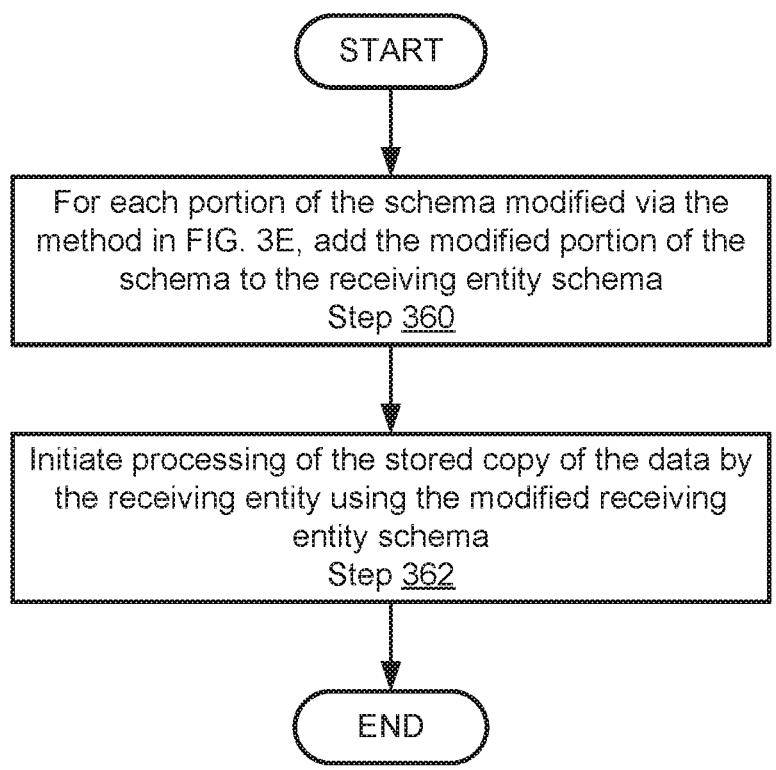
FIG. 3F shows a diagram of a flowchart of a method of modifying a receiving entity schema based on an adapted schema in accordance with one or more embodiments of the invention.

In one or more embodiments of the invention, the receiving entity schema is modified using the method illustrated in FIG. 3F. The receiving entity schema may be modified using different methods without departing from the invention.

The method may end following Step 3A.

FIG. 3B shows a flowchart of a method in accordance with one or more embodiments of the invention. The method depicted in FIG. 3B may be used to obtain a schema in accordance with one or more embodiments of the invention. The method shown in FIG. 3B may be performed by, for example, a data transfer manager (110, FIG. 1). Other components of the system (100) illustrated in FIG. 1 may perform the method of FIG. 3B without departing from the invention.

In Step 320, a request for a schema is sent to a computation framework of a sending entity.

In one or more embodiments of the invention, the request specifies all or a portion of the schema. The portion of the schema may be the portions of the schema related to particular data. The particular data may be data to be transferred from the sending entity to a receiving entity. The schema may include, for example, metadata regarding the locations of portions of data in storage resources of the sending entity.

In Step 322, the schema is obtained after sending the request for the schema.

In one or more embodiments of the invention, the schema is obtained by the computation framework indicating a location of a copy of the schema stored in memory, as opposed to the location of the schema stored in a persistent storage.

The copy of the schema may be stored in memory by the computation framework in response to the request of Step 320. The copy of the schema may be stored in memory as part of a computation performed by the computation framework. The computation may generate a data result that includes the schema. Once generated, the data result may be stored in memory. The storage location in the memory of the schema may be provided to the requesting entity in response to the request for the schema.

The method may end following Step 320.

FIG. 3C shows a flowchart of a method in accordance with one or more embodiments of the invention. The method depicted in FIG. 3C may be used to obtain a current storage location of data in accordance with one or more embodiments of the invention. The method shown in FIG. 3C may be performed by, for example, a data transfer manager (110, FIG. 1). Other components of the system (100) illustrated in FIG. 1 may perform the method of FIG. 3C without departing from the invention.

In one or more embodiments of the invention, the data for transfer between computation frameworks may include multiple components. For example, as described with respect to FIG. 2A, data may include multiple files or other portions that are delineated. Each of the multiple components of the data may be stored anywhere within a persistent storage. The multiple components are not necessarily in contiguous blocks of the persistent storage. Further, each component of the data may be stored across multiple blocks. Before Step 330, all portions of the data are considered to be unprocessed. As seen from FIG. 3C, the method includes a loop that results in an unprocessed portion of the data being marked as processed. Thus, each completion of the loop represents the processing of one portion of the data. In some embodiments of the invention, multiple portions of the data may be processed in parallel rather than serially as illustrated in FIG. 3C. Any number of portions of the data may be processed in any combination of serial and parallel execution without departing from the invention.

In Step 330, an identifier of an unprocessed portion of the data is obtained.

In one or more embodiments of the invention, an unprocessed portion is selected at random from the other unprocessed portions of the data. The unprocessed portion may be selected using other methods without departing from the invention.

In one or more embodiments of the invention, the identifier is a filename or a uniform resource indicator. For example, as described with respect to FIG. 2B, each portion of the data may be associated with an identifier.

In Step 332, the obtained identifier is matched to persistent storage access information in the schema.

In one or more embodiments of the invention, the schema is the sending entity schema. As illustrated in FIG. 2B, the schema may include mappings between identifiers and persistent storage access information. Thus, matching the obtained identifier to an identifier included in the schema matches the obtained identifier to persistent storage access information via the mapping. In other words, the entry having an identifier that matches the obtained identifier includes the persistent storage access information.

In one or more embodiments of the information, the persistent storage access information includes block identifiers, or other identifiers, that may be used by a storage manager to directly access information stored in the persistent storage that stores the to-be transferred data.

In Step 334, the matched persistent storage access information is stored as a portion of the current storage location.

As discussed above, the method illustrated in FIG. 3C includes a loop, i.e., Steps 330-338, that may be performed multiple times. Each time the loop is performed, matched persistent storage access information may be added to the current storage location. Thus, the current storage location may include the aggregated persistent storage access information for each portion of the to-be-transferred data.

In Step 336, it is determined whether persistent storage access information has been obtained for all portions of the to-be-transferred data. If persistent storage access information has been obtained for all portions of the to-be-transferred data, the method may end following Step 336. If persistent storage access information has not been obtained for all portions of the to-be-transferred data, the method may proceed to Step 338.

In Step 338, the unprocessed portion of the data selected in Step 330 is marked as processed.

The method may return to Step 330 following Step 338.

FIG. 3D shows a flowchart of a method in accordance with one or more embodiments of the invention. The method depicted in FIG. 3D may be used to determine a future storage location for data in accordance with one or more embodiments of the invention. The method shown in FIG. 3D may be performed by, for example, a data transfer manager (110, FIG. 1). Other components of the system (100) illustrated in FIG. 1 may perform the method of FIG. 3D without departing from the invention.

In Step 340, a receiving entity schema is obtained.

In one or more embodiments of the invention, the receiving entity is the entity to which the data is to be transferred. The receiving entity schema may include information that describes the organizational structure of the storage resources of the receiving entity.

In Step 342, an organizational structure of data stored by a receiving entity is identified based on the obtained receiving entity schema.

In one or more embodiments of the invention, the identified organizational structure may specify one or more of: (i) a naming convention of portions of data, (ii) a storage location strategy, e.g., an organizational structures, that dictates the location where different portions of the data are stored, and/or (iii) locations where data may be stored within the storage resources of the receiving entity.

In Step 344, the future storage location is selected based on the identified organization structure.

In one or more embodiments of the invention, the future storage location is selected by identify available storage locations within the storage resources of the receiving entity that have sufficient capacity to store to-be-stored data.

The method may end following Step 334.

FIG. 3E shows a flowchart of a method in accordance with one or more embodiments of the invention. The method depicted in FIG. 3E may be used to determine a future storage location for data in accordance with one or more embodiments of the invention. The method shown in FIG. 3E may be performed by, for example, a data transfer manager (110, FIG. 1). Other components of the system (100) illustrated in FIG. 1 may perform the method of FIG. 3E without departing from the invention.

In Step 350, for each portion of the copy of the data stored in the receiving entity: (i) a storage location of the portion of the copy of the data is identified, (ii) an identifier for the portion of the copy of the data is selected, and/or (iii) a portion of the obtained schema implicated by each portion of the copy of the data is identified.

In one or more embodiments of the invention, the storage location is the block identifiers of the persistent storage storing the portion of the copy of the data.

In one or more embodiments of the invention, the selected identifier is a uniform resource identifier. The value of the uniform resource indicator may be any value.

In one or more embodiments of the invention, the portion of the obtained schema implicated by each portion of the copy of the data may be the entries of the schema, e.g., FIG. 2B, used to perform matching in Step 332 of FIG. 3C. For example, the aforementioned entries include the persistent storage access information associated with each portion of the data stored in Step 308 of FIG. 3A.

In Step 352, each identified portion of the obtained schema in Step 350 is modified to reflect the corresponding identified storage location and selected identifier.

For example, as illustrated in FIG. 2B, each entry may include persistent storage access information. The persistent storage access information may be modified to include the corresponding identified storage location. Similarly, the identifier of the entry may be modified to reflect the selected identifier.

The method may end following Step 352.

FIG. 3F shows a flowchart of a method in accordance with one or more embodiments of the invention. The method depicted in FIG. 3F may be used to modify a receiving entity schema based on an adapted schema in accordance with one or more embodiments of the invention. The method shown in FIG. 3F may be performed by, for example, a data transfer manager (110, FIG. 1). Other components of the system (100) illustrated in FIG. 1 may perform the method of FIG. 3F without departing from the invention.

In Step 360, for each portion of the schema modified via the method of FIG. 3E, the modified portion of the schema is added to the schema of the receiving entity.

In one or more embodiments of the invention, adding the modified portions to the receiving entity schema add a number of entries to the receiving entity schema. Each entry corresponds to a respective modified portion and includes the access information of the respective modified portion of the schema.

In Step 362, processing of the stored copy of the data is initiated in the receiving entity using the modified receiving entity schema.

In one or more embodiments of the invention, initiating processing of the stored copy of the data causes one or more data results to be generated. The data results may be, for example, tables of data.

The method may end following Step 362.

Figure 4A:
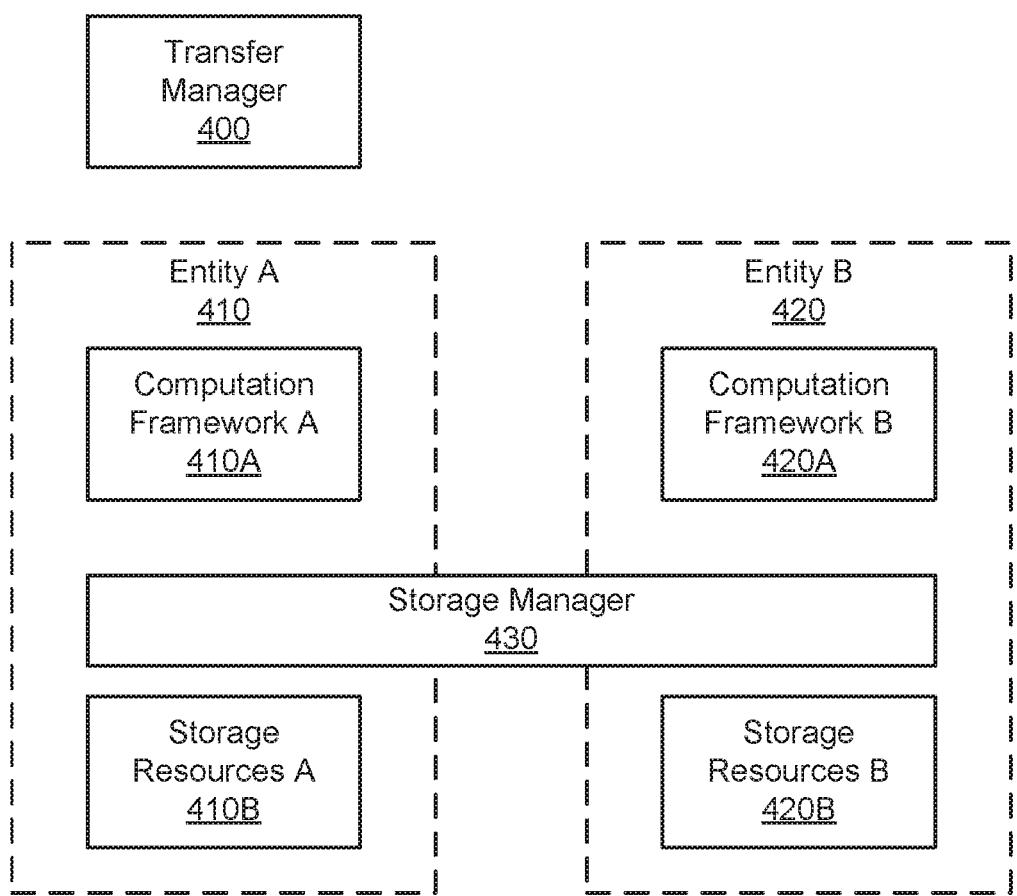
FIG. 4A shows an example system.
Figure 4B:
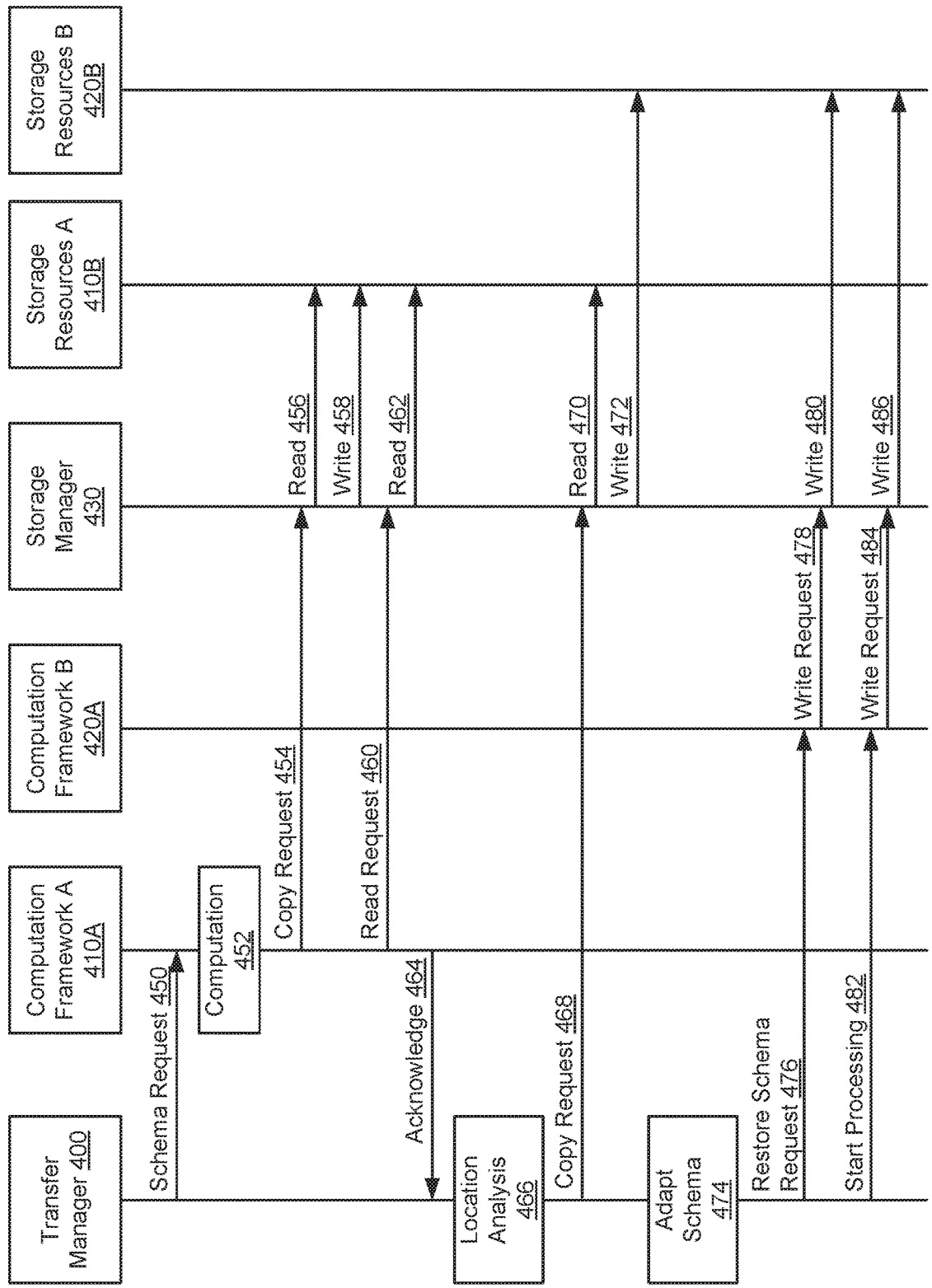
FIG. 4B shows a sequence diagram of actions performed by the system of FIG. 4A.

To further clarify aspects of the invention, a non-limiting example is shown in FIGS. 4A and FIG. 4B shows a sequence diagram performed by the example system in FIG. 4A. The example included is for explanatory purposes and is not limiting

EXAMPLE

FIG. 4A shows a diagram of the example system. The example system may be similar to the system illustrated in FIG. 1. Not all components of the example system are shown in FIG. 4A for brevity.

The example system includes a transfer manager (400) that performs data transfers between entities (410, 420). The example system includes two entities, entity A (410) and entity B (420). Entity A (410) includes computation framework A (410A) and storage resources A (410B). Entity B (420) includes computation framework B (420A) and storage resources B (420B). The computation frameworks (410A, 420A) may be processes executing using computing resources of respective computing clusters (not shown). The storage resources (410B, 420B) may be the storage resources of the respective computing clusters.

The example system also includes a storage manager (430) that provides access to the storage resources (410B, 420B). The storage manager (430) provides block level access to the storage resources. The storage manager (430) could provide file level access in addition or alternatively to block level access.

FIG. 4B shows a sequence diagram performed by the system shown in FIG. 4A. In the sequence diagram, arrows represent communications between components of the system and blocks represent actions performed by the components. The vertical axes represents the relative timing of the communications and actions. Thus, arrows or boxes lower in the diagram represent communications or actions performed after the communications or actions associated with arrows higher in the diagram.

The sequence diagram is initiated by the transfer manager (400) receiving a data transfer request. In response to receiving the data transfer request, the transfer manager (400) sends a schema request to the computation framework A (410A).

In response to receiving the schema request, the computation framework A (410A) performs a computation (452). As part of the computation (452), a copy request (454) is issued to the storage manager (430) that requests that the schema associated with computation framework A (410A) be copied.

In response to receiving the copy request (454), the storage manager (430) issues read (456) and write (458) commands to copy the schema. The copy of the schema may be stored as a data result.

After issuing the copy request (454), the computation framework A (410A) issues a read request (460) to read the copy of the schema in the data result into memory. In response to receiving the read request (460), the storage manager (430) issues a read (462) to read the copy of the schema into memory.

After the schema is read into memory, the computation framework A (410A) sends an acknowledgement (464) to the transfer manager (400). The acknowledgement may include access information for the schema stored in memory and thereby enable the transfer manager (400) to access the schema in memory.

After receiving the acknowledgement (464), the transfer manager performs a location analysis (466) to determine a current storage location of the data indicated in the data transfer request and/or future storage location for the transferred data. The location analysis (466) may be similar to the method illustrated in FIGS. 3C and 3D.

After performing the location analysis (466), the transfer manager (400) issues a copy request (468) to the storage manager. The copy request may request that the data included in the locations identified in the location analysis (466) is to be copied to the storage resources B (420).

In response to receiving the copy request (468), the storage manager (430) issues read (470) and write (472) commands to make a copy of the data in the storage resources B (420B). By copying the data in this manner, a second copy of the data is not stored in the storage resources A (410B). In contrast, when reading the schema (e.g., 450-462), a second copy of the schema is stored in the storage resources A (410B).

After sending the copy request (468), the transfer manager (400) adapts the copy of the schema (474) stored in memory. Adapting the copy of the schema modifies it to reflect the location of the copy of the data stored in storage resources B (420B).

After adapting the schema (474) in memory, a restore schema request (476) is sent to computation framework B (420A). The restore schema request (476) indicates that the schema in storage resources B (420B) is to be updated based on the adapted schema.

In response to the restore schema request (476), computation framework B (420A) issues a write (480) to the storage resources B (420B) that causes a portion of the schema in the storage resources B (420B) to be over written using a portion of the adapted schema in memory. Restoring the schema in storage resources B (420B) updates the schema so that it properly reflects the data stored in the storage resources B (420B) written by write (472).

After sending the restore schema request (476), a start processing (482) request is sent to the computation framework B (420A). In response to the start processing (482) request, the computation framework B (420A) initiates computations and write request (484) based on the computations. The computations may reflect results based on the data written to storage resources B (420B) by the write (472).

In response to the write request (484), the storage manager (430) issues a write (486) to store the result of the computation in the storage resources B (420B).

The Example Ends

Figure 5:
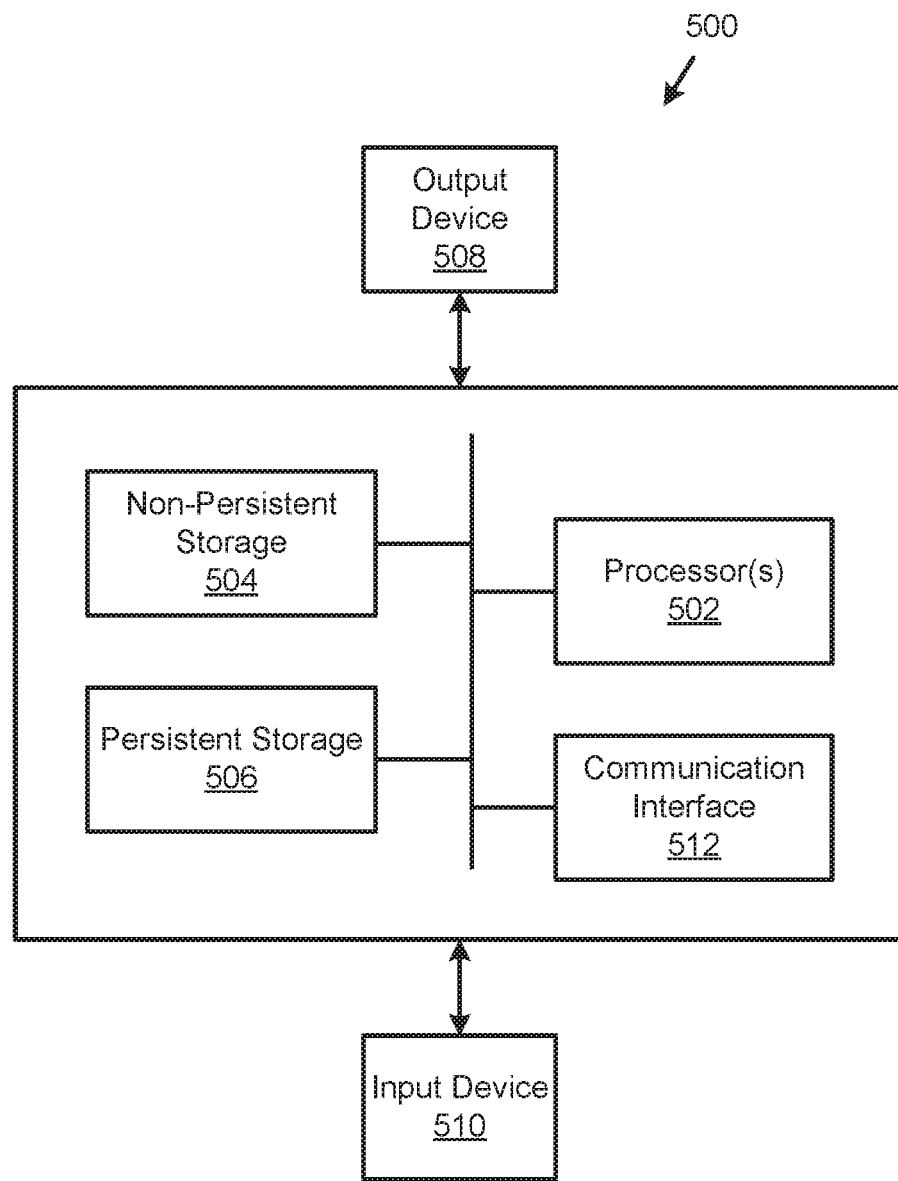
FIG. 5 shows a diagram of a computing device in accordance with one or more embodiments of the invention.

As discussed above, embodiments of the invention may be implemented using computing devices. FIG. 5 shows a diagram of a computing device in accordance with one or more embodiments of the invention. The computing device (500) may include one or more computer processors (502), non-persistent storage (504) (e.g., volatile memory, such as random access memory (RAM), cache memory), persistent storage (506) (e.g., a hard disk, an optical drive such as a compact disk (CD) drive or digital versatile disk (DVD) drive, a flash memory, etc.), a communication interface (512) (e.g., Bluetooth interface, infrared interface, network interface, optical interface, etc.), input devices (510), output devices (508), and numerous other elements (not shown) and functionalities. Each of these components is described below.

In one embodiment of the invention, the computer processor(s) (502) may be an integrated circuit for processing instructions. For example, the computer processor(s) may be one or more cores or micro-cores of a processor. The computing device (500) may also include one or more input devices (510), such as a touchscreen, keyboard, mouse, microphone, touchpad, electronic pen, or any other type of input device. Further, the communication interface (512) may include an integrated circuit for connecting the computing device (500) to a network (not shown) (e.g., a local area network (LAN), a wide area network (WAN) such as the Internet, mobile network, or any other type of network) and/or to another device, such as another computing device.

In one embodiment of the invention, the computing device (500) may include one or more output devices (508), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (502), non-persistent storage (504), and persistent storage (506). Many different types of computing devices exist, and the aforementioned input and output device(s) may take other forms.

Embodiments of the invention may improve the performance of computations in a network environment by improving the efficiency of transferring data between entities in the network environment. More specifically, embodiments of the invention may improve the efficiency of data transfer by avoiding the invocation of computations performed by a computation framework as part of the data transfer process. By avoiding the invocation of computation performed by a computation framework, the computing resource cost of transferring data may be reduced. Specifically, the quantity of processor cycles, disk Input-Output, and/or network bandwidth may be reduced when compared to methods of transferring data that utilize computation frameworks to obtain portions of stored data as part of a data transfer. Thus, embodiments of the invention may address the problem of performing data transfers in a network environment. Some embodiments of the invention may address the problem in the context of big data where the data sets on which computations are performed are very large. Thus, some embodiments of the invention address the problem of data transfer between entities in a big data environment. In the context of a big data environment, the problem addressed here arises directly due to the nature of the technological environment. Large data sets on which computations are performed may not be practically stored by any sing computing devices and, therefore, requires that the data be stored via a distributed storage.

Throughout this application, elements of figures may be labeled as A to N. As used herein, the aforementioned labeling means that the element may include any number of items and does not require that the element include the same number of elements as any other item labeled as A to N. For example, a data structure may include a first element labeled as A and a second element labeled as N. This labeling convention means that the data structure may include any number of the elements. A second data structure, also labeled as A to N, may also include any number of elements. The number of elements of the first data structure and the number of elements of the second data structure may be the same or different.

One or more embodiments of the invention may be implemented using instructions executed by one or more processors of the data management device. Further, such instructions may correspond to computer readable instructions that are stored on one or more non-transitory computer readable mediums.

While the invention has been described above with respect to a limited number of embodiments, those skilled in the art, having the benefit of this disclosure, will appreciate that other embodiments can be devised which do not depart from the scope of the invention as disclosed herein. Accordingly, the scope of the invention should be limited only by the attached claims.

What is claimed is:

1. A system, comprising:
    a persistent storage for storing:
        sending entity storage resources exclusively for a first computation framework, and
        receiving entity storage resources exclusively for a second computation framework; and
    a data transfer manager comprising a processor and a memory and programmed to:
        obtain a data transfer request from one of the first computation framework and the second computation framework, wherein the data transfer request is for data in the sending entity storage resources;
        in response to obtaining the data transfer request:
            obtain a sending entity schema of the first computation framework associated with the data,
            determine a current storage location of the data using the obtained sending entity schema,
            determine a future storage location for a copy of the data in the receiving entity storage resources,
            store the copy of the data at the determined future storage location without invoking either of the first computation framework and the second computation framework,
            adapt the sending entity schema to obtain an adapted sending entity schema comprising the determined future storage location in which the copy of the data is stored, and
            modify a receiving entity schema of the second computation framework based on the adapted sending entity schema.

2. The system of claim 1, wherein obtaining the sending entity schema associated with the data comprises:
    sending a request for the sending entity schema to the first computation framework of the sending entity; and
    obtaining the sending entity schema after sending the request for the schema.

3. The system of claim 2, wherein sending the request for the sending entity schema initiates a computation in the first computation framework of the sending entity.

4. The system of claim 3, wherein the computation stores the sending entity schema in the sending entity storage resources.

5. The system of claim 4, wherein the computation in a query.

6. The system of claim 1, wherein determining the current storage location of the data using the obtained sending entity schema comprises:
    obtaining a plurality of identifiers for portions of the data;
    matching respective identifiers of the plurality of identifiers to respective persistent storage access information for the sending entity storage resources; and
    storing the matched persistent storage access information for the sending entity storage resources as the current storage location.

7. The system of claim 1, where the sending entity storage resources comprises:
    the sending entity schema; and
    the data,
    wherein the sending entity schema comprises persistent storage access information associated with the data.

8. The system of claim 1, wherein storing the copy of the data at the determined future storage location comprises:
    initiating a block level read of the persistent storage based on the determined current storage location.

9. The system of claim 8, wherein the first computation framework of the sending entity does not initiate the block level read.

10. The system of claim 8, wherein the block level read is initiated by sending a request to a storage manager of the persistent storage.

11. The system of claim 1, wherein adapting the sending entity schema based on the determined future storage location comprises:
    identifying a plurality of portions of the obtained sending entity schema associated with a plurality of portions of the copy of the data stored in the receiving entity storage resources;
    generating, for each portion of the copy of the data stored in the receiving entity storage resources generate, update information comprising:
        a storage location of the respective portion of the copy of the data in the receiving entity storage resources, and
        an identifier for the respective portion of the copy of the data in the receiving entity storage resources; and
    modifying each portion of the plurality of portions of the obtained sending entity schema to reflect the generated update information.

12. The system of claim 11, wherein modifying each portion of the plurality of portions of the obtained sending entity schema to reflect the generated update information creates mappings between each portion of the plurality of portions of the obtained sending entity schema to the respective associated portions of the copy of the data stored in the receiving entity storage resources.

13. The system of claim 1, wherein modifying the receiving entity schema based on the adapted sending entity schema comprises:
    adding a portion of the adapted sending entity schema to the receiving entity schema, wherein the portion of the adapted sending entity schema was modified by the adapting.

14. The system of claim 13, wherein modifying the receiving entity schema based on the adapted sending entity schema further comprises:
    omitting a second portion of the adapted sending entity schema from adding to the receiving entity schema, wherein the second portion of the adapted sending entity schema was not modified by the adapting.

15. A method of transferring data from a sending entity to a receiving entity, comprising:
    obtaining a data transfer request for the data in sending entity storage resources of the sending entity to receiving entity storage resources of the receiving entity, wherein the sending entity storage resources are exclusively associated with a first computation framework and the receiving entity storage resources are exclusively associated with a second computation framework, and wherein the data transfer request is obtained from one of the first computational framework and the second computation framework;

in response to obtaining the data transfer request:
- obtaining a sending entity schema of the first computation framework associated with the data,
- determining a current storage location of the data using the obtained sending entity schema,
- determining a future storage location for a copy of the data in receiving entity storage resources associated with the receiving entity,
- storing the copy of the data at the determined future storage location,
- adapting the sending entity schema to obtain an adapted sending entity schema comprising the determined future storage location in which the copy of the data is stored without invoking either of the first computation framework and the second computation framework, and
- modifying a receiving entity schema, associated with the receiving entity, based on the adapted sending entity schema.

16. The method of claim 15, wherein obtaining the sending entity schema associated with the data comprises:
- sending a request for the sending entity schema to the first computation framework of the sending entity; and
- obtaining the sending entity schema after sending the request for the schema.

17. The system of claim 15, wherein storing a copy of the data at the determined future storage location comprises:
- initiating a block level read of the persistent storage based on the determined current storage location by sending a request to a storage manager that manages the sending entity storage resources.

18. A non-transitory computer readable medium comprising computer readable program code, which when executed by a computer processor enables the computer processor to perform a method for transferring data from a sending entity to a receiving entity, the method comprising:
- obtaining a data transfer request for the data in sending entity storage resources of the sending entity to receiving entity storage resources of the receiving entity, wherein the sending entity storage resources are exclusively associated with a first computation framework and the receiving entity storage resources are exclusively associated with a second computation framework, and herein the data transfer request is obtained from one of the first computational framework and the second computation framework;

in response to obtaining the data transfer request:
- obtaining a sending entity schema of the first computation framework associated with the data,
- determining a current storage location of the data using the obtained sending entity schema,
- determining a future storage location for a copy of the data in receiving entity storage resources associated with the receiving entity,
- storing the copy of the data at the determined future storage location,
- adapting the sending entity schema to obtain an adapted sending entity schema comprising the determined future storage location in which the copy of the data is stored without invoking either of the first computation framework and the second computation framework, and
- modifying a receiving entity schema, associated with the receiving entity, based on the adapted sending entity schema.

19. The non-transitory computer readable medium of claim 18, wherein obtaining the sending entity schema associated with the data comprises:
- sending a request for the sending entity schema to the first computation framework of the sending entity; and
- obtaining the sending entity schema after sending the request for the schema.

20. The non-transitory computer readable medium of claim 18, wherein storing a copy of the data at the determined future storage location comprises:
- initiating a block level read of the persistent storage based on the determined current storage location by sending a request to a storage manager that manages the sending entity storage resources.

* * * * *